Patented Apr. 28, 1936

2,038,836

UNITED STATES PATENT OFFICE 2,038,836

COMPOSITION CONTAINING A CELLULOSE COMPOUND AND A TITANIUM SALT OF AN AROMATIC POLYBASIC ACID

Henry A. Gardner, Washington, D. C.

No Drawing. Application September 5, 1935,
Serial No. 39,359

9 Claims. (Cl. 106—40)

The present invention relates to titanium salts of aromatic polybasic acids, to a process by which the said titanium salts may be prepared, and to certain compositions of matter consisting essentially of dispersions of the said titanium salts, in finely divided form, in dispersion media comprising compounds of cellulose.

Some metallic salts of organic polybasic acids are per se known. However, so far as I am aware, titanium salts of aromatic polybasic acids, e. g., titanium phthalate, titanium maleate, or, more generally, titanium salts of benzene dicarboxylic acids, have not heretofore been known. While in the following I shall describe more particularly the salt titanium phthalate, its production, and certain compositions of matter containing it, it is to be understood that the invention is not, in its larger aspects, restricted to a titanium salt of phthalic acid specifically but rather that it includes titanium salts of the acids hereinbefore mentioned.

Titanium phthalate is, as prepared, a finely divided, white solid of good hiding power, and answers the general criteria of a commercial pigment. I have found that as titanium phthalate is deprived of contained water it tends to lose opacity, and that when it is thoroughly dried (as by ovening at a temperature slightly above the boiling point of water, say, at 105° C., for several hours), it may become somewhat translucent and friable. If the pigment is taken from water solution through the imposition of alcohol, with subsequent drying of the alcoholic media, a more opaque and less horny material is obtained. It is, however, relatively insoluble in water and almost all organic solvents. I have found that it has certain unpredictable and very desirable properties. Thus, as disclosed in my application Serial No. 9,348, it has a pronounced retarding effect toward "chalking" and color failure in pigmented paints, enamels, lacquers and the like when intimately associated with, e. g., carried as a deposit on, the pigment of such film-forming coating compositions.

I have found, also, that titanium phthalate, and, in fact, all titanium salts of organic polybasic acids, has the property of retarding growth of mildew and other destructive organisms in or on cellulosic filaments, films and the like; and that it has the further property of minimizing the transmission of ultra-violet light. Dispersed throughout cellulosic filaments, films, bands or masses, it imparts a soft, translucent, "delustered" appearance to the cellulosic material, or, when used in larger proportion, opacifies the cellulosic material.

The preparation of titanium phthalate involves reacting a phthalic acid compound with a reactive salt of titanium, in an aqueous medium. The reaction product, consisting predominately of titanium phthalate, separates out of the liquid medium as a very finely divided water-insoluble, white, solid, which may be removed from the liquid medium in known manner. Because the preparation of the titanium salt of phthalic acid is relatively difficult as contrasted with the preparation of many other metal salts of that acid, I give the following detailed description of a preferred mode of production:

Example I 2 molecular parts of phthalic acid anhydride are dissolved in boiling water, and there is gradually added 4 molecular parts of caustic soda. According to this, 296 parts by weight of phthalic acid anhydride require 160 parts by weight of caustic soda to form a practically neutral salt. A neutral salt of this character is necessary for the best results.

1 molecule of titanium oxide (molecular weight 80) in the form of an aqueous solution of a reactive salt of titanium requires 2 molecules of phthalic acid anhydride (molecular weight 296) to produce a titanium phthalate (molecular weight 376).

It is desirable that the reactive salt of titanium, e. g., titanium sulphate, if highly acid, be first partially neutralized to bring it to a point where there is no great quantity of free acid, e. g., sulphuric acid. For this purpose the titanium sulphate solution is gradually treated with dilute caustic soda. The titanium sulphate, however, should be left in an acid condition. For instance, I have made quite a wide series of precipitates under varying conditions. If the titanium sulphate is practically neutral, the resulting precipitate will contain a large percentage of titanium hydrate and the percentage of titanium phthalate will be considerably less than normal. Titanium sulphate as prepared commercially is often extremely acid. If it is of a high acid content, it is advantageous, of course, to effect only partial neutralization. For instance, the Work acidity factor is one which I have employed to advantage. This factor is arrived at by dividing the percentage of free sulphuric acid in the titanium sulphate by the percentage of combined sulphuric acid present, thus establishing what is known as the Work acidity factor. While I have secured fairly good yields with titanium sulphates having Work acidity factors of over 1, I appear to get the best results from those having a Work acidity factor of approximately 0.44. Such a form of titanium sulphate would contain the following percentages of constituents:

TiO₂ _____ 5.7 grams per 100 cc. of solution
Combined
H₂SO₄ ____ 14.0 grams per 100 cc. of solution
Free H₂SO₄ _ 6.2 grams per 100 cc. of solution Moreover, I have ascertained through a rather wide series of tests that when batches of titanium sulphate are not entirely neutralized, greater yields of more exact composition are obtained. On the other hand, if the titanium sulphate is very highly acid, delayed precipitation is observed and the yield and composition of the product may be unsatisfactory.

An amount of titanium sulphate solution equivalent to one mol. of titanium oxide and the above-described sodium phthalate solution, equivalent to 2 mols. of phthalic acid anhydride, is gradually added. A beautiful white pigment is precipitated. It is extremely finely divided, almost colloidal in appearance. It is washed and filtered. After the material is filtered, and before it is dried in an oven, it may to advantage be dried by running alcohol through the precipitate until the water is removed. After evaporation of the alcohol, a very finely divided, fluffy white pigment that does not exhibit fritted particles is produced.

Titanium phthalate theoretically contains approximately 21% of titanium oxide, but if any hydrolysis takes place during precipitation, the percentage of titanium present would be raised to some extent. For instance, I have prepared a number of samples of titanium phthalates containing varying percentages of titanium hydroxide, and, while the presence of titanium hydroxide is admissible in the precipitate, any very great percentage tends to affect the color of the product when exposed in oil to the atmosphere as a paint, slight yellowing taking place. It is conceivable, however, that certain percentages of titanium hydroxide in titanium phthalate might under some conditions even prove desirable from the standpoint of weathering, some of my exposures having given exceptional results in this direction.

As will be obvious, the polybasic acid salts involved in the present invention yield, upon treatment with a saponification substance, the metal compounds and acids from which they were formed: thus, the saponification products of titanium phthalate may be sodium phthalate and titanium hydroxide, oxide or other titanium compound. Heating a titanium phthalate pigment with a strong alkali or base may yield vapors of phthalic anhydride or in some instances carbonic dioxide, benzoic acid or benzene.

Titanium salts of other species of aromatic polybasic acids are similarly prepared.

As an illustration of my process of treating known pigments with titanium phthalate the following is given:

*Example II*

2,000 grams of a titanium oxide-containing pigment, such as titanium oxide, or a mixed pigment consisting of 1 part by weight of titanium oxide and 3 parts by weight of barium sulphate, is placed in a container, together with 10,000 grams of water. There is then poured onto the mass 1,000 grams of slightly acid titanium sulphate solution containing 42.5 grams of titanium oxide as sulphate. Then there is prepared as a separate solution 160 grams of phthalic acid anhydride (this being a slight excess) dissolved in 3,000 grams of water, containing 87 grams of caustic soda. This solution is then gradually poured into the first container containing the titanium oxide pigment, water and titanium sulphate. Immediately, titanium phthalate is precipitated onto the surfaces of the titanium pigment particles. Approximately 200 grams of titanium phthalate is thus precipitated on the 2,000 grams of white titanium pigment. After thorough agitation and washing, the pigment product is filtered and dried. The material is then pulverized and is ready to use in paint.

*Example III*

The above example can be repeated, using the same amounts of reactants and the same or similar proportions between titanium phthalate and pigment, but substituting another pigment, e. g., a colored pigment such as lead chromate, for the titanium pigment base. When the resulting composite pigment, or treated pigment, is thoroughly dried it is found to have the same, or substantially the same, color effect as that of the pigment base, but is more durable, and is less subject to chalking and color failure than is the pigment base per se.

While in the two preceding examples there has been described the association of exactly 10% by weight of titanium phthalate with 90% of pigment base, it is to be understood that these proportions may be varied within reasonable limits, it being the crux of this embodiment of the invention to associate with the base pigment a relatively small (i. e., minor) amount of the titanium phthalate.

I have found that the products of this invention have other exceptionally valuable uses. For instance, when titanium phthalate (or a similar titanium salt of another aromatic polybasic acid or of a benzene carboxylic acid) is dispersed in a cellulose ester or ether it produces a composition which is susceptible to many industrial applications: when such a composition in fluid form is forced through spinnerettes and normally processed, the resulting filaments have a translucent, delustered appearance. If the compositions referred to above, in fluid or semiplastic form, are projected through apertures of the slit type and normally processed, they produce sheets having a soft, translucent, delustered appearance of a distinctly opaque appearance, depending upon the percentage of the titanium phthalate that has been used. Moreover, the said titanium compounds have a distinct influence in giving to the film, filament or the like definite resistance to growth of mildew or other destructive organism, thus acting as preservatives of the cellulosic material. When used in even small quantity the titanium phthalate appears to have a distinct effect in minimizing the transmission of ultra-violet light, thus making cellulosic films, for instance, containing that salt distinctly superior as wrapping material for butter or other foodstuffs which are rapidly made rancid through the action of light.

When the compositions referred to above are used in plastics of the celluloid type the same effects as have been noted above for filaments and sheets are observed. It is to be understood that solidification of a dispersion of the titanium salt in a solution of a cellulosic compound results in a solid composition in which the said salt is dispersed throughout the solid cellulosic compound.

As an example of the method of using titanium phthalate in artificial silk, for instance, I give the following:

Example IV

I first dissolve 100 pounds of cellulose nitrate, cellulose acetate or other cellulosic material, in 400 pounds, more or less, of acetone or other organic solvent therefor. I then add 2 pounds of titanium phthalate (although I have secured good results with as low as 1 pound or as high as 5 pounds), and thoroughly disperse the material by agitation, pebble mill grinding, or otherwise, pebble mill grinding being the preferred mode. In making this addition I may first disperse the titanium phthalate in a portion of the organic solvent or in an oil, or in any other liquid medium so that it will be thoroughly smooth at the time of incorporation into the cellulosic material. When working with viscose (cellulose xanthate compositions) I first disperse the titanium phthalate in water before adding it to the viscose. Any one of these compositions which have thus been pigmented is then extruded through apertures to form filaments which are processed in known manner: the resulting filaments have the soft, delustered appearance referred to above.

Example V

To a cellulose xanthate jelly, such as is used in the manufacture of cellulosic films, I add from 6% to 10% by weight of titanium phthalate, based on the actual content of cellulose present in the jelly. This material is then extruded through slits to form sheets or films which then pass through precipitating baths and washing baths and are then dried or otherwise processed in the ordinary manner to form commercial sheets. The percentage of titanium phthalate which I have added in the above instance is usually sufficient to give a somewhat opaque film having unique properties. Lower or higher percentages can be employed, but it is my opinion that the 6% referred to above is the most desirable for the purpose of producing a film which will be quite opaque to ultraviolet light, thus minimizing the transmission thereof, and yet have a sufficient degree of transparency to make it attractive in appearance.

Example VI

Precipitate a batch of titanium phthalate, and, after washing and filtering, add sufficient alcohol to remove the water. After several filtrations, the pasty mass will probably be found to consist of approximately 66% alcohol and 34% titanium phthalate, depending upon conditions of preparation. This pigment paste is incorporated into a lacquer according to the following formula:

| | Grams |
|---|---|
| Nitrocellulose solution in butyl alcohol, containing 25% by weight of nitrocellulose | 250 |
| Toluene | 250 |
| Titanium oxide | 60 |
| Butyl acetate | 40 |
| Dibutyl phthalate plasticizer | 40 |
| Titanium phthalate-alcohol paste | 120 |

The lacquer referred to in the above formula, when spread on a surface, forms a dense white film. This same lacquer tinted blue, green, or in other delicate tints or shades which usually fade in the sun, will be found to withstand such action remarkably well. Instead of chalking, the white or tinted lacquers will show great resistance to chalking. The use, therefore, of a lacquer of the above composition on automobiles or other objects which are exposed to sunlight should show markedly better service than is obtained today with compositions containing ordinary titanium pigments.

It will be appreciated that the liquid, semi-solid or solid compositions comprising the titanium salt and the compound of cellulose may contain also one or more of the plasticizers and/or fillers and/or pigments or other modifying agents known to be useful in such cellulosic compositions.

While I usualy employ white metallic salts of titanium for this purpose I find that colored salts of other metals combined with benzene carboxylic acids perform in the same manner.

This application contains subject matter in common with my application Serial No. 9,348, filed March 4, 1935.

I claim:

1. A composition of matter consisting essentially of a dispersion of a finely divided solid titanium salt of an aromatic polybasic acid in a dispersion medium comprising a compound of cellulose.

2. The composition of matter defined in claim 1, in which the dispersion medium is a cellulose ether.

3. The composition of matter defined in claim 1, in which the dispersion medium is a cellulose ester.

4. The composition of matter defined in claim 1, in which the dispersion medium includes a solution of a compound of cellulose in an organic solvent therefor.

5. The composition of matter defined in claim 1, in which the dispersion medium consists essentially of a solid compound of cellulose.

6. An artificial silk filament containing dispersed therethrough finely divided particles of a titanium salt of an aromatic polybasic acid.

7. A cellulosic film containing dispersed therethrough finely divided particles of a titanium salt of an aromatic polybasic acid.

8. A plastic mass consisting essentially of a cellulosic material containing dispersed therethrough finely divided particles of a titanium salt of an aromatic polybasic acid.

9. The composition of matter defined in claim 1, characterized in that the dispersoid is titanium phthalate.

HENRY A. GARDNER.